United States Patent
Sano et al.

(10) Patent No.: US 7,341,430 B2
(45) Date of Patent: Mar. 11, 2008

(54) VANE WHEEL FOR TORQUE CONVERTER AND MANUFACTURING METHOD

(75) Inventors: Akihiko Sano, Tokyo (JP); Yoshitaka Miura, Yokohama (JP); Tsutomu Kamitani, Ebina (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 111 days.

(21) Appl. No.: 11/022,797

(22) Filed: Dec. 28, 2004

(65) Prior Publication Data

US 2006/0140766 A1 Jun. 29, 2006

(51) Int. Cl.
*F04D 29/38* (2006.01)
(52) U.S. Cl. .................. 416/180; 416/197 C; 416/234; 416/248; 164/131; 164/137
(58) Field of Classification Search .......... 416/180, 416/197 C, 248, 234; 415/915; 425/443; 164/131, 137, 339, 342
See application file for complete search history.

(56) References Cited

U.S. PATENT DOCUMENTS

| | | | | | |
|---|---|---|---|---|---|
| 2,481,541 | A | * | 9/1949 | Schneider | 416/180 |
| 4,043,385 | A | * | 8/1977 | Petrenchik | 164/342 |
| 5,037,272 | A | * | 8/1991 | By | 416/180 |
| 6,623,265 | B1 | * | 9/2003 | Day | 425/438 |

FOREIGN PATENT DOCUMENTS

| JP | 8-105506 A | 4/1996 |
|---|---|---|
| JP | 2002-295632 A | 10/2002 |

* cited by examiner

*Primary Examiner*—Ninh H. Nguyen
(74) *Attorney, Agent, or Firm*—Foley & Lardner LLP

(57) ABSTRACT

A vane wheel for torque converter with a plurality of blades formed integrally with a shell in a casting process is disclosed. The blade tilts relative to an axial direction of the vane wheel and has an inner surface located on a positive pressure side thereof and an outer surface located on a negative pressure side thereof. A root thickness in a middle section between an outer periphery side and an inner periphery side of the shell is thicker than a root thickness on the inner periphery side relative to a blade cross section along a circumferential direction from an axis center of the vane wheel.

14 Claims, 19 Drawing Sheets

US 7,341,430 B2

VANE WHEEL FOR TORQUE CONVERTER AND MANUFACTURING METHOD

BACKGROUND OF THE INVENTION

1. Field of the Invention

The present invention relates to a vane wheel for torque converter and manufacturing method.

2. Description of the Related Art

On a vane wheel for torque converter disclosed in the publication of unexamined patent application, JP-H8-105506, a plurality of slits are formed on a shell, to which a plurality of nails formed on a blade are inserted, and the blade is fixed to the shell by bending the nails by means of the rolling process.

On a vane wheel for torque converter disclosed in the publication of unexamined patent application, JP-2002-295632, a blade is fixed to a core and a shell with tabs formed on its outer and inner peripheries.

SUMMARY OF THE INVENTION

The vane wheel for torque converter of the related art has a problem that it typically has too many blade components making the process of fixing the blade to the shell (and the core) time consuming, and thus raising its manufacturing cost. Moreover, since it depends on the rigidity of its components to achieve its overall strength, it is difficult to reduce its weight.

An object of the invention is to provide a vane wheel for torque converter and manufacturing method for making it possible to reduce manufacturing cost and weight.

It is still more specific object of the invention to provide a vane wheel for torque converter with a plurality of blades formed integrally with a shell in a casting process. The blade tilts relative to an axial direction of the vane wheel and has an inner surface located on a positive pressure side thereof and an outer surface located on a negative pressure side thereof. A root thickness in a middle section between an outer periphery side and an inner periphery side of the shell is thicker than a root thickness on the inner periphery side relative to a blade cross section along a circumferential direction from an axis center of the vane wheel.

It is still more specific object of the invention to provide a method of manufacturing a vane wheel for torque converter having a shell and a plurality of blades in a casting process by means of a mold assembly, wherein the mold assembly comprises a stationary die having a cavity surface that corresponds to an outer periphery of the shell and a movable die having a cavity surface that corresponds to an outer surface of the blade, wherein the movable die is rotatable freely around an axis center of the vane wheel and movable freely along an axial direction of the vane wheel, wherein the blade tilts relative to the axial direction of the vane wheel and has an inner surface located on a positive pressure side thereof and an outer surface located on a negative pressure side thereof, and wherein a root thickness in a middle section between an outer periphery side and an inner periphery side of the shell is thicker than a root thickness on the inner periphery side relative to a blade cross section along a circumferential direction from the axis center of the vane wheel, the method comprising separating the movable die from the stationary die by moving the movable die along the axial direction of the vane wheel while rotating the movable die around the axis center of the vane wheel after the casting process.

The objects, features, and characteristics of this invention other than those set forth above will become apparent from the description given herein below with reference to preferred embodiments illustrated in the accompanying drawings.

DETAILED DESCRIPTION OF THE PREFERRED EMBODIMENT

Figure 1:
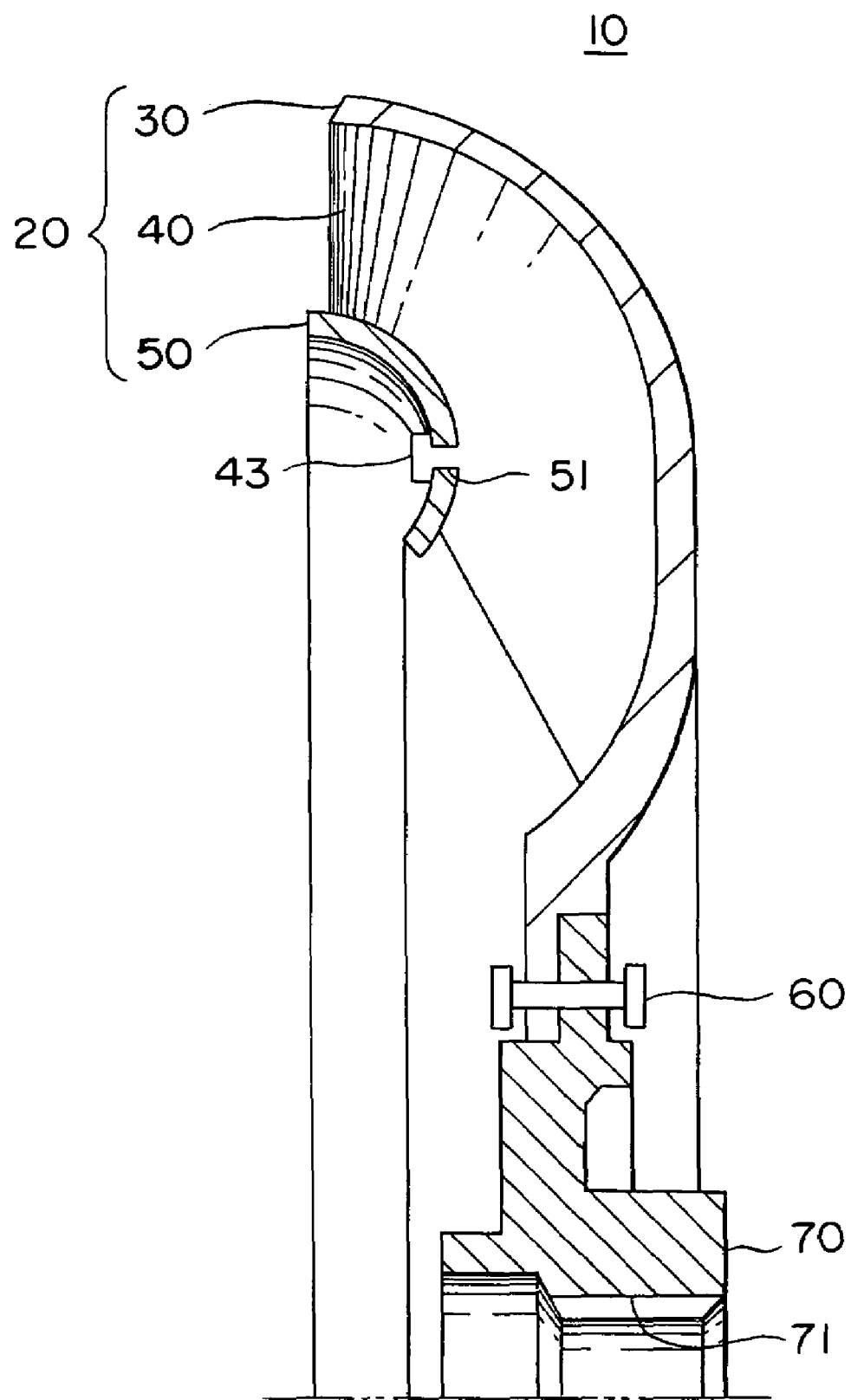
FIG. 1 is a sectional view of the turbine of a torque converter according to a first embodiment.

The embodiments of this invention will be described below with reference to the accompanying drawings. FIG. 1 is a sectional view of the turbine of a torque converter according to the first embodiment.

The torque converter according to the first embodiment is connected to an automatic speed reducer to form an automatic transmission, having a pump impeller (vane wheel) as an input element and a turbine runner (vane wheel) 20 as an output element, and is filled with an operating fluid in the inside.

The pump impeller is connected to a converter cover that rotates with the crankshaft of the engine. The turbine runner 20 is connected to the input shaft of the automatic speed reducer via a splined section 71 of a turbine hub 70, which is fixed with rivets 60 to the turbine runner.

When the engine rotates, the pump impeller and the converter cover rotate as well. As a result, the turbine runner 20 rotates based on the pumping action of the pump impeller, the rotation being transmitted to the input shaft.

The turbine runner 20 has a shell 30 disposed outside, a plurality of blades 40, and a core 50 located inside. The core 50 has an opening 51 and a protrusion 43 is formed on the core side of the blade 40.

The junction of the blade 40 and the core 50 is accomplished by pushing the protrusion 43 of the blade 40 to penetrate through the opening 51 of the core 50 and caulking it. The abovementioned junction can be accomplished not only by caulking but also by other appropriate junction methods such as welding and brazing.

Figure 2:
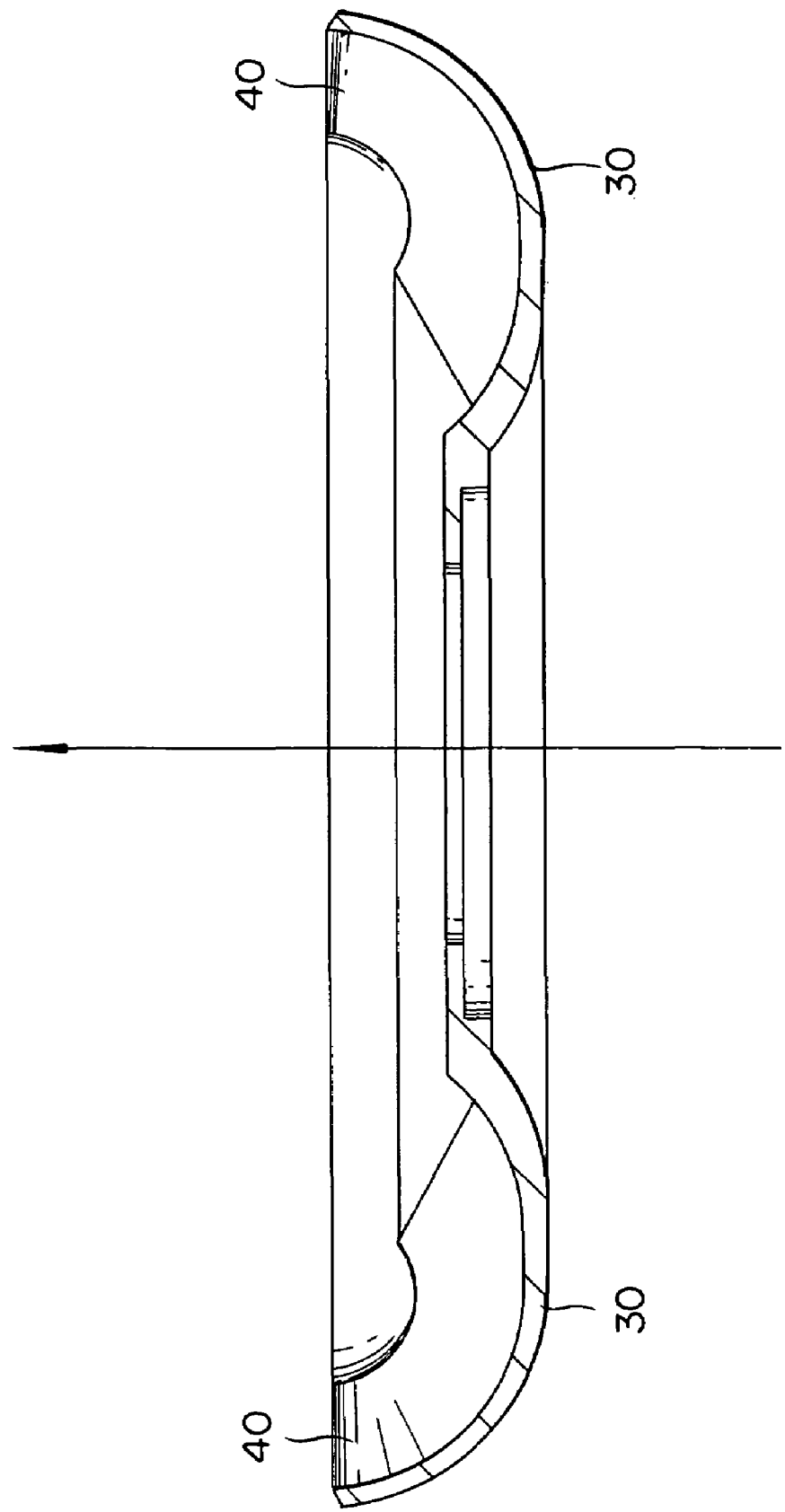
FIG. 2 is a sectional view of a turbine runner according to the first embodiment.
Figure 3:
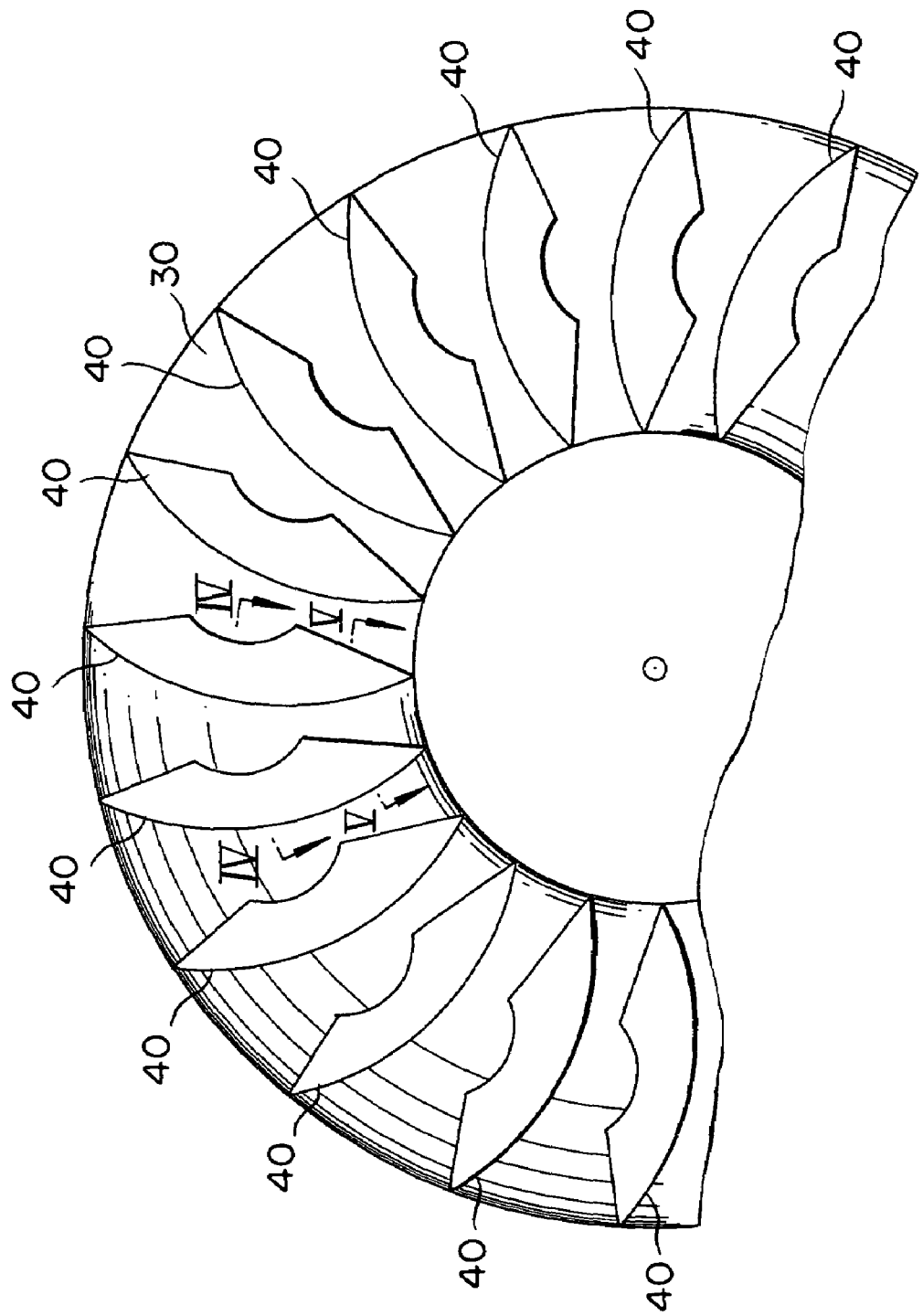
FIG. 3 is a plan view of the turbine runner of FIG. 2.
Figure 4:
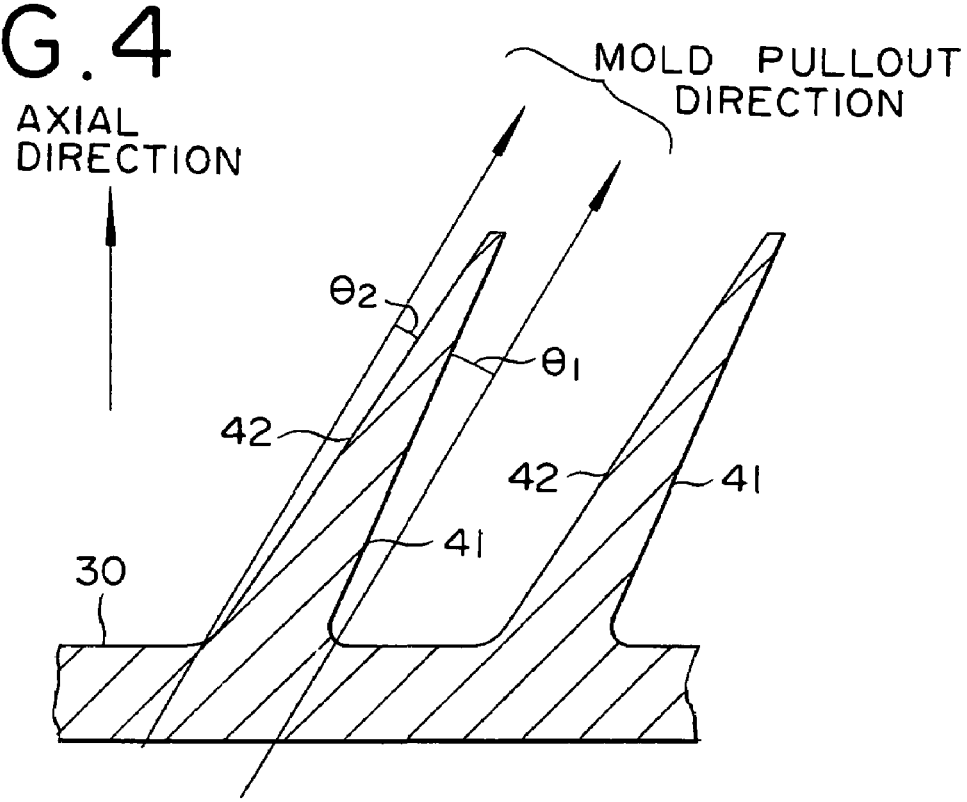
FIG. 4 is a sectional view taken on line IV-IV of FIG. 3.
Figure 5:
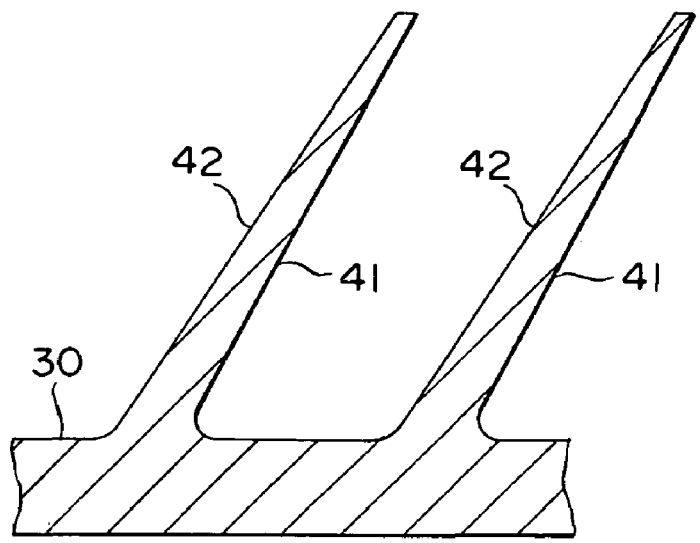
FIG. 5 is a sectional view taken on line V-V of FIG. 3.

FIG. 2 is a sectional view of the turbine runner according to the first embodiment. FIG. 3 is a plan view of the turbine runner. FIG. 4 is a sectional view taken on line IV-IV of FIG. 3. FIG. 5 is a sectional view taken on line V-V of FIG. 3. For the sake of simplicity, the core 50 is not shown in these drawings.

The shell 30 and the blades 40 are formed integrally by casting and the blades 40 are arranged equally spaced with each other along the circumferential direction of the shell 30. The shell 30 and the blades 40 are made of a light metal such as aluminum and magnesium.

Consequently, the manufacturing cost of the turbine runner 20 is reduced as the assembling of the shell 30 and the blades 40, which would otherwise constitute a major portion of the assembly work, is eliminated. Moreover, it makes it possible to achieve a necessary rigidity as an integral part, so that reduction in weight can be easily made.

The blade 40 has a shape tapered in the axial direction of the turbine runner 20, with an inner side surface 41 located on the pressure side (pressure surface side) and an outer side surface 42 located on the negative pressure side (non-pressure side).

The root thickness of the blade 40 in the middle of the circumferential direction, i.e., the root thickness of a part located in the middle between the outer and inner periphery sides of the shell 30 (FIG. 4), is greater than the root thickness of the blade 40 on the outer and inner sides located on both sides of said middle section (FIG. 5).

In other words, in a blade cross section taken along the circumferential direction from the axis center of the turbine runner 20, the root thickness in the middle section is thicker than the root thickness on the inner periphery and the root thickness of the blade 40 reduces from the middle section of the circumferential direction toward the outer periphery side and the inner periphery side.

Such a design is effective in mitigating hydraulic losses that affect the transmission efficiency, such as the peel-off loss and losses caused by pressure changes. The blade section extends along the circumferential direction and forms a portion of a cylindrical surface, but it is expressed as a plane on the drawings.

As can be seen from the above, the first embodiment provides a vane wheel for torque converter that allows us to reduce the manufacturing cost and the weight while maintaining a good performance.

The intersecting angle $\theta_1$ between the rotary pullout direction of a molding die and the edge line of the inner side surface 41 of the blade cross section (blade 40) as well as the intersecting angle $\theta_2$ between said rotary pullout direction and the edge line of the outer side surface 42 is chosen to be greater than the draft angle required in the casting process. The draft angle is typically 2 degrees.

The intersecting angle $\theta_1$ is preferably larger than the intersecting angle $\theta_2$ in order that the molding die or the movable die of the mold assembly, which will be described later, can be smoothly separated. The outer and inner peripheries of the blade 40 preferably have wall thicknesses of a necessary minimum considering the flows of molten metal and the draft angle in the casting process.

Figure 6:
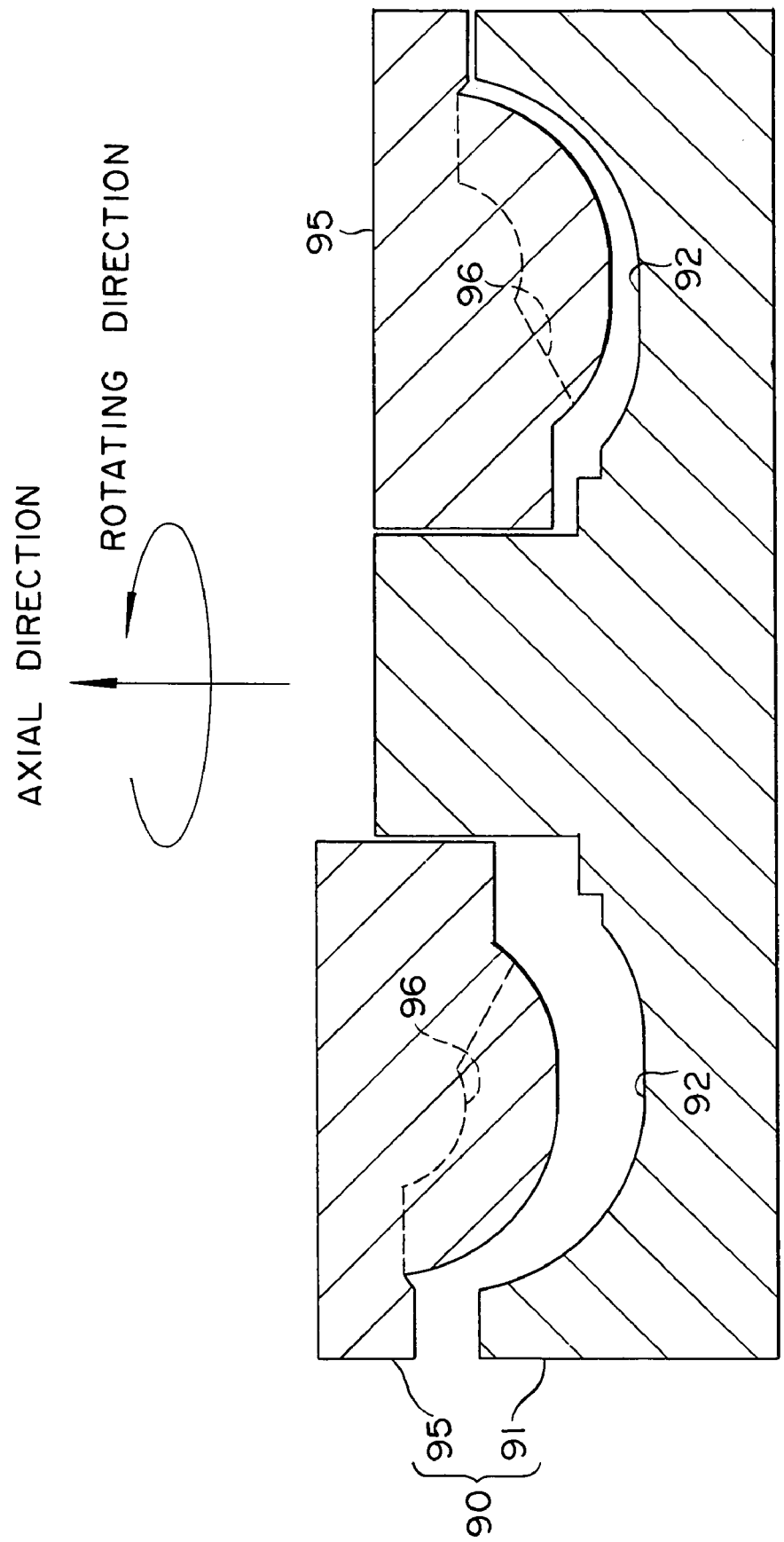
FIG. 6 is a sectional view of assistance in explaining a mold assembly for manufacturing the turbine runner according to the first embodiment.

FIG. 6 is a sectional view of assistance in explaining a mold assembly used for manufacturing a turbine runner. The mold assembly 90 has a stationary die 91 and the movable die 95. The stationary die 91 has a cavity surface 92 that corresponds to the outer circumference of the shell 30. The movable die 95 has a cavity surface 96 that corresponds to the outer surface of the blade 40, rotates free around the axis of the turbine runner 20, and moves freely along the axial direction of the turbine runner 20.

Figure 7A:
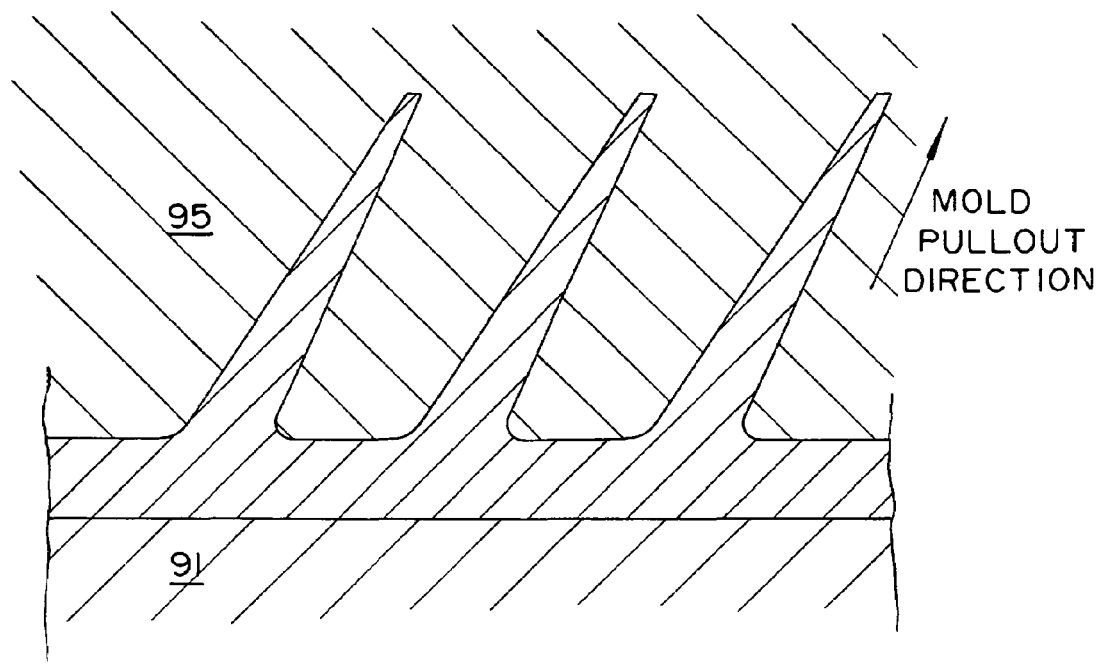
FIGS. 7A, 7B and 7C are sectional views of assistance in explaining pullout of a movable die at the middle of the circumferential direction of the blade.
Figure 7B:
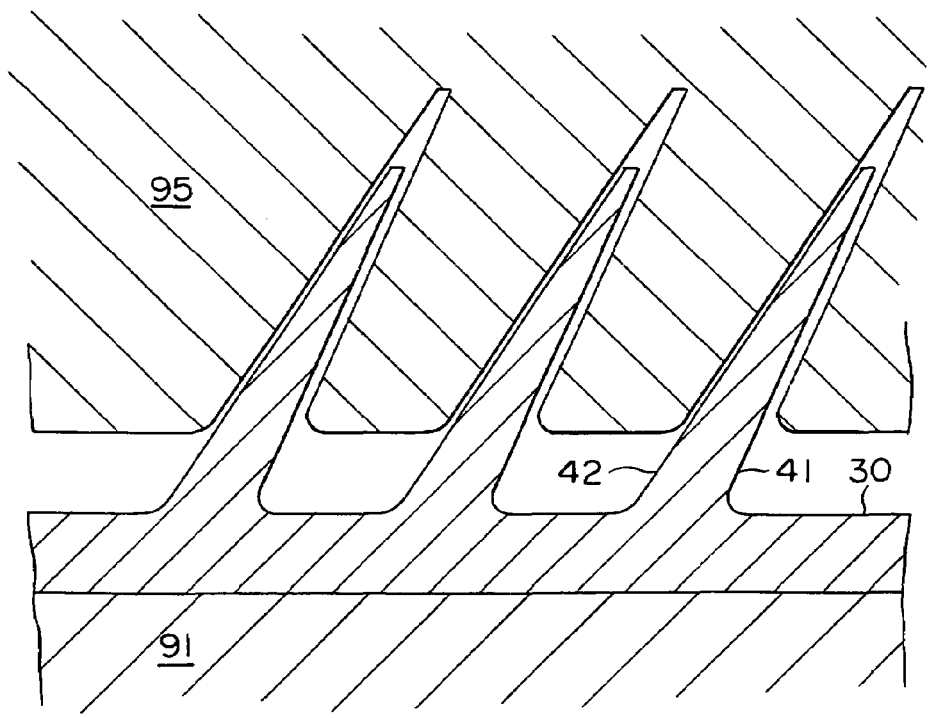
Figure 7C:
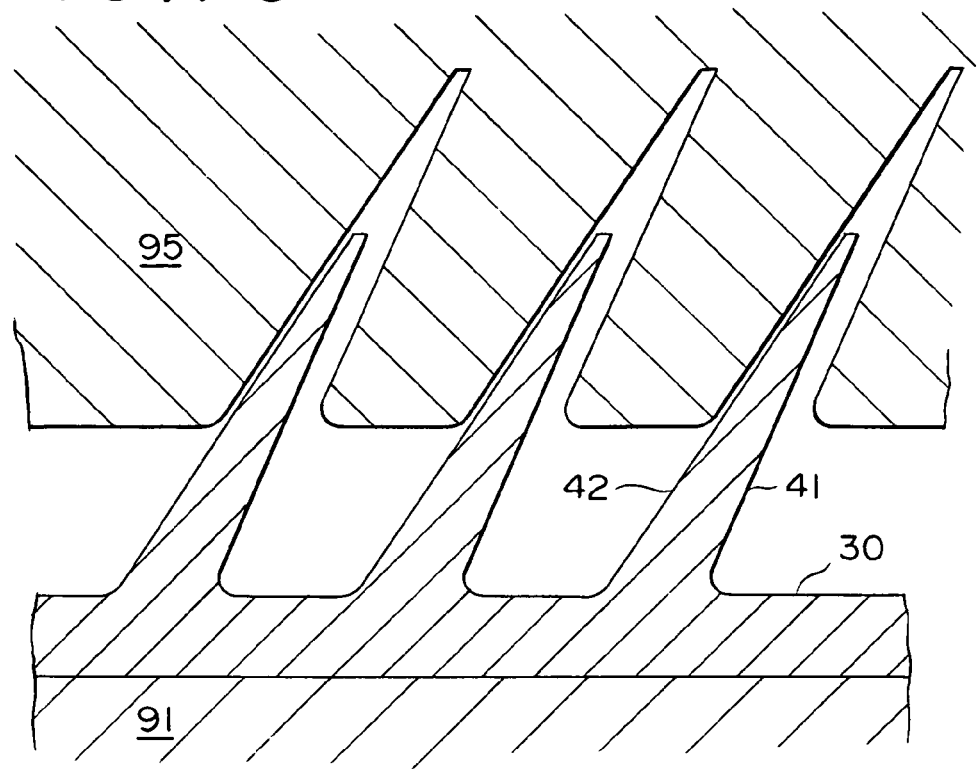
Figure 8A:
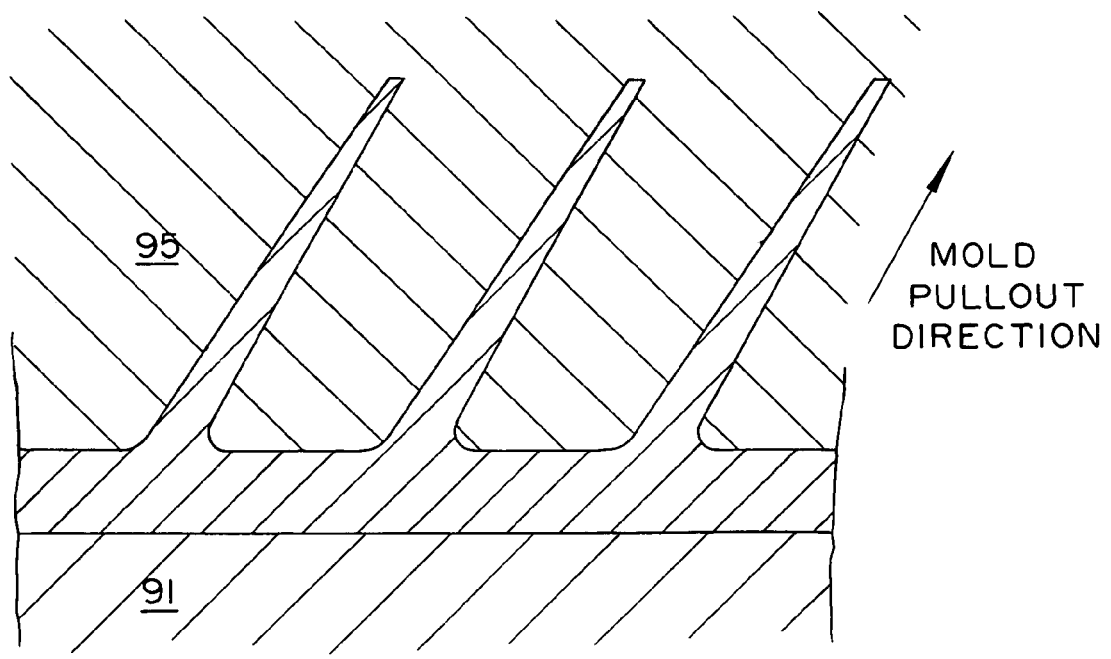
FIGS. 8A, 8B and 8C are sectional views of assistance in explaining pullout of a movable die at the outer and inner peripheries of the blade.
Figure 8B:
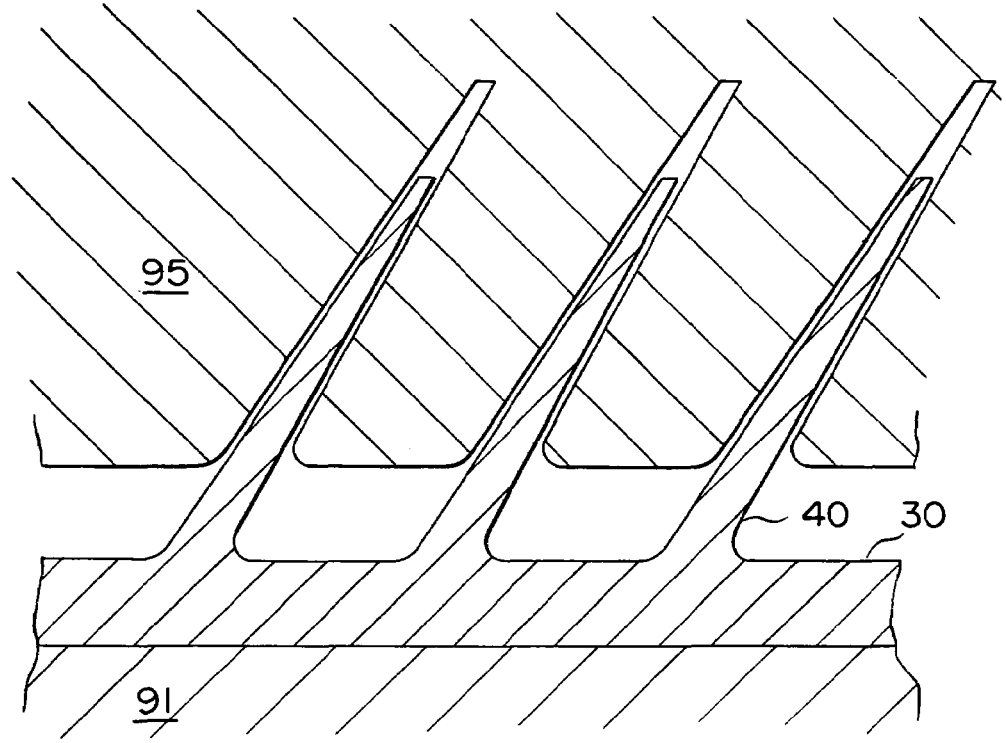
Figure 8C:
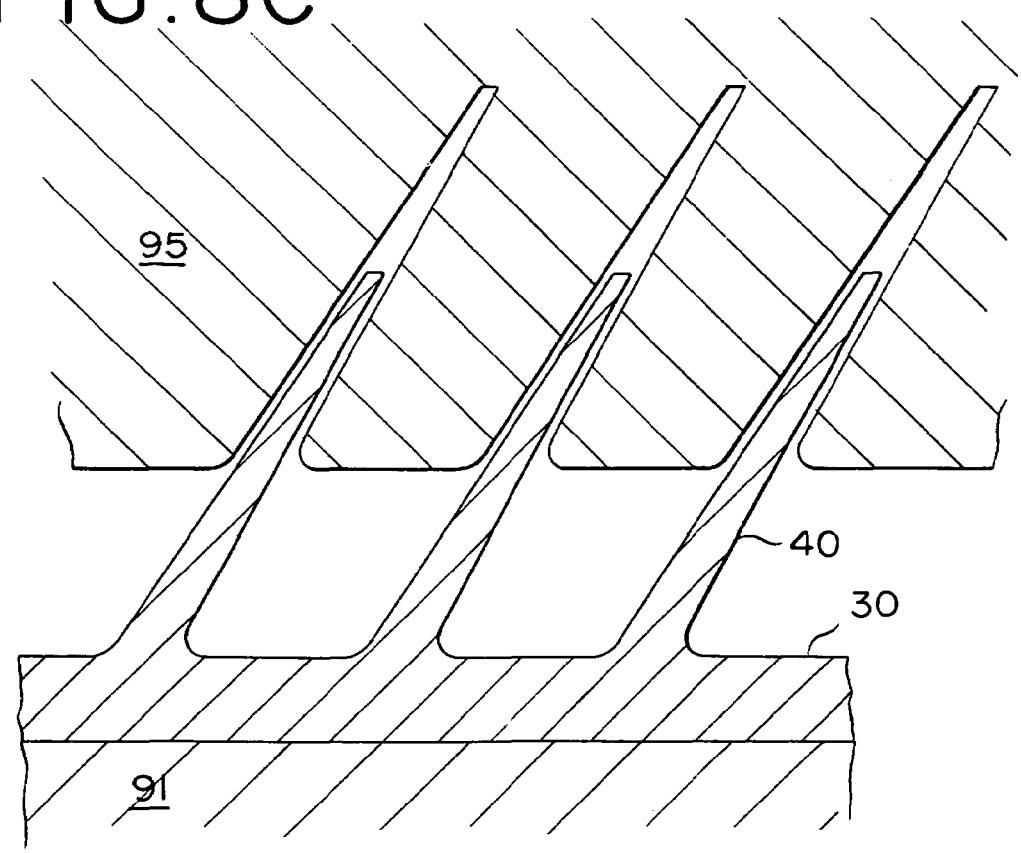

Next, the method of manufacturing the turbine runner will be described. FIGS. 7A, 7B and 7C are sectional views of assistance in explaining pullout of a movable die at the middle of the circumferential direction of the blade. FIGS. 8A, 8B and 8C are sectional views of assistance in explaining pullout of a movable die at the outer and inner peripheries of the blade.

The movable die 95 is first moved toward the stationary die 91, clamped against the latter and the casting material is introduced to cast the turbine runner having the shell 30 and a plurality of the blades 40. The casting material is a light metal such as aluminum, magnesium.

The movable die 95 is then rotated around the axis of the turbine runner while being moved along the axis direction of the turbine runner. The blade 40 tilts against the axial direction of the turbine runner and the root thickness in the middle between the outer periphery side and the inner periphery side of the shell 30 relative to the blade cross section along the circumferential direction from the axis of the turbine runner is thicker than the root thickness on the inner periphery side.

Therefore, the movable die 95 can be separated or pulled out without interfering with the manufactured cast product, i.e., the turbine runner. Thus, it is possible to apply a high pressure casting with a superior productivity than the low pressure casting which uses a core made of sand, etc.

The shell 30 and the blades 40 thus manufactured are formed integrally, so that it eliminates the assembling time that would have been required otherwise for assembling the blades 40 to the shell 30 that constitute a large part of the assembly time of the turbine in the conventional method. Moreover, it makes it possible to achieve a necessary rigidity as an integral part, so that reduction in weight can be easily made.

In the meanwhile, since the root thickness in the middle of the blades of the turbine runner as manufactured is thicker than the root thickness on the inner periphery side, hydraulic losses that affect the transmission efficiency, such as the peel-off loss and losses caused by pressure changes, can be reduced as well.

The intersection angle $\theta_1$ of the inner side surface 41 of the blade 40 is greater than the intersecting angle $\theta_2$ of the outer side surface 42. Therefore, the movable die 95 can be securely and smoothly pulled out without interfering with the turbine runner as shown in FIGS. 7A, 7B and 7C.

The thicknesses of the blade 40 on the outer and inner periphery sides are preferably the necessary minimum considering the flow of the molten metal in the casting process and the rotary pullout direction of the movable die 95. With such a constitution, the movable die 95 can be securely and smoothly pulled out without interfering with the blade 40 on either the outer periphery side or the inner periphery side as shown in FIGS. 8A, 8B and 8C.

As can be seen from the above, the first embodiment provides the manufacturing method of the vane wheel for torque converter that allows us to reduce the manufacturing cost and the weight while maintaining a good performance.

Figure 9:
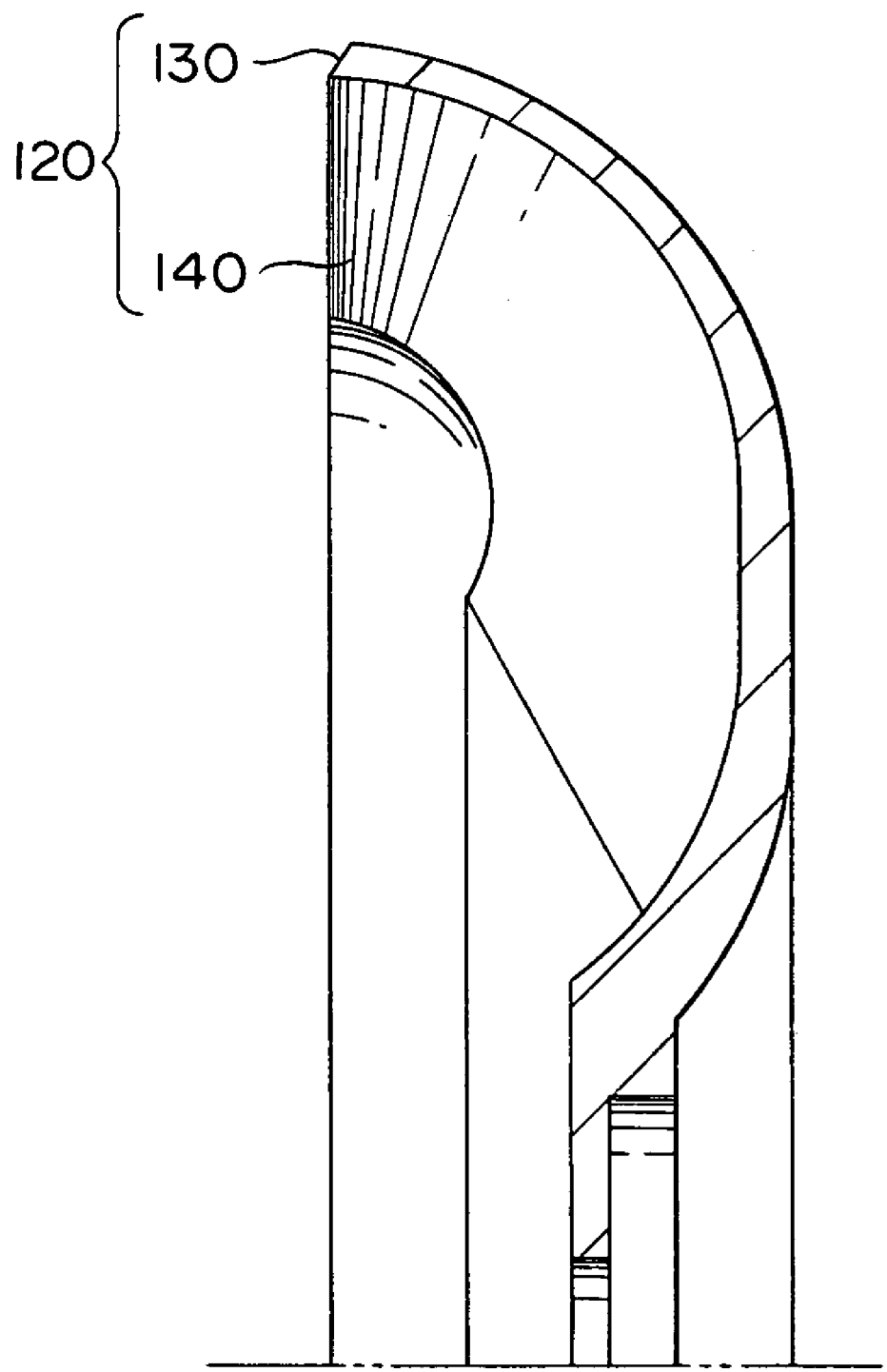
FIG. 9 is a sectional view of a turbine runner according to a second embodiment.

FIG. 9 is a sectional view of a turbine runner according to a second embodiment. A turbine runner 120 is substantially different from the turbine runner 20 of the first embodiment in that it does not have the core.

The turbine runner 120 cannot seek the function for supporting and fixing the upper end of the blade 140 on the core side. However, since the blade 140 is cast integrally with the shell 130, the attitude accuracy of the blade 140 basically corresponds to the accuracy of the mold assembly.

Therefore, it is possible to secure the attitude accuracy of the blade 140 uniformly although this second embodiment is a coreless type.

Figure 10:
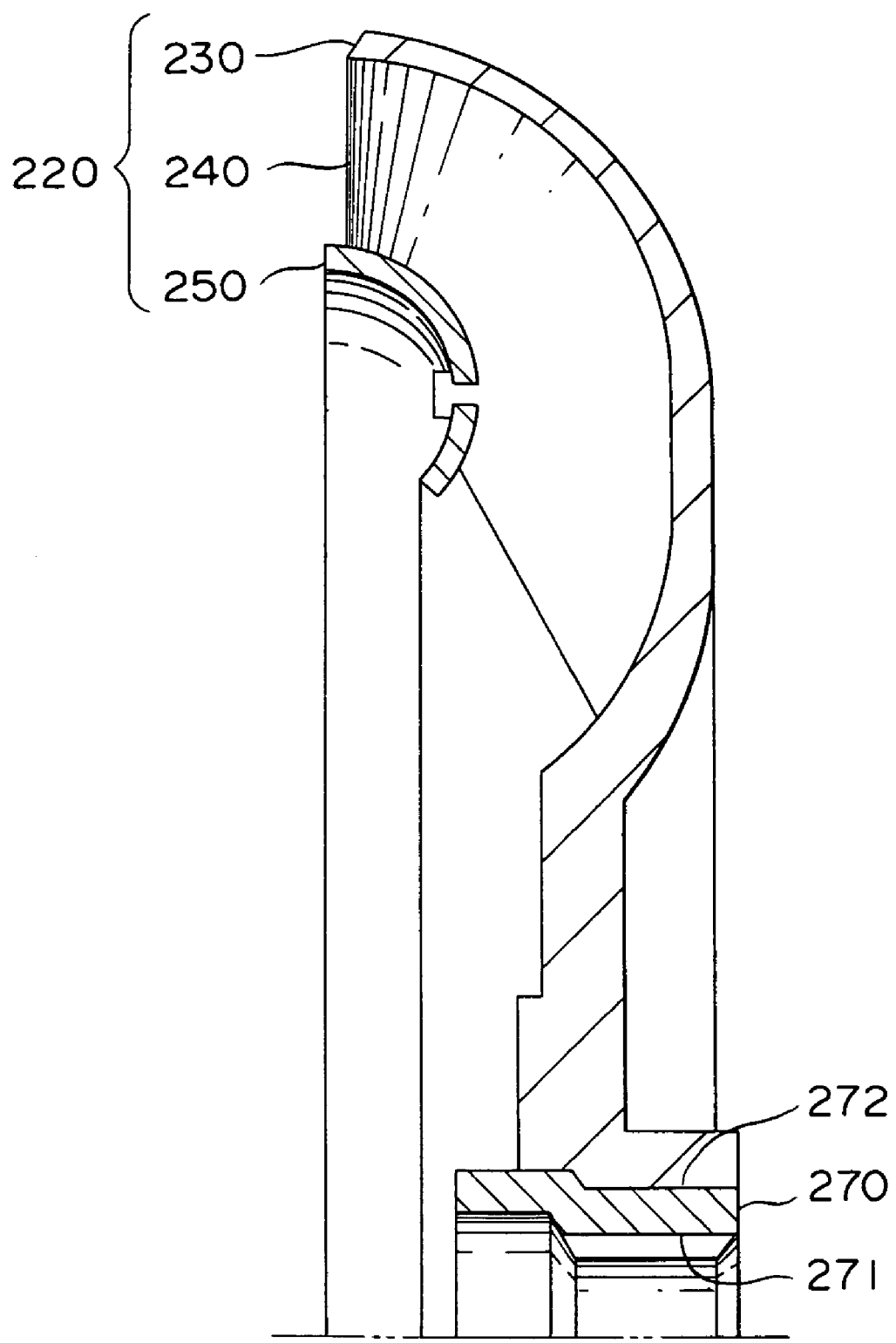
FIG. 10 is a sectional view of a turbine runner according to a third embodiment.

FIG. 10 is a sectional view of a turbine runner according to a third embodiment. A turbine runner 220 is substantially different from the turbine runner 220 of the first embodiment in that a turbine hub 270 is press-fitted to be fastened.

The turbine runner 220 and the turbine hub 270 are not fastened by rivets. The turbine hub 270 is shaped substantially tubular and includes a splined section 271 for transmitting the output torque. The material of the turbine hub 270 is, for example, steel. The outer periphery 272 of the turbine hub 270 is formed with a special process such as knurling in order to increase the surface friction.

Therefore, the manufacturing cost can be reduced in the third embodiment as the size and the machining area of the turbine hub 270 can be reduced. The process of increasing the friction can be omitted if necessary.

Figure 11:
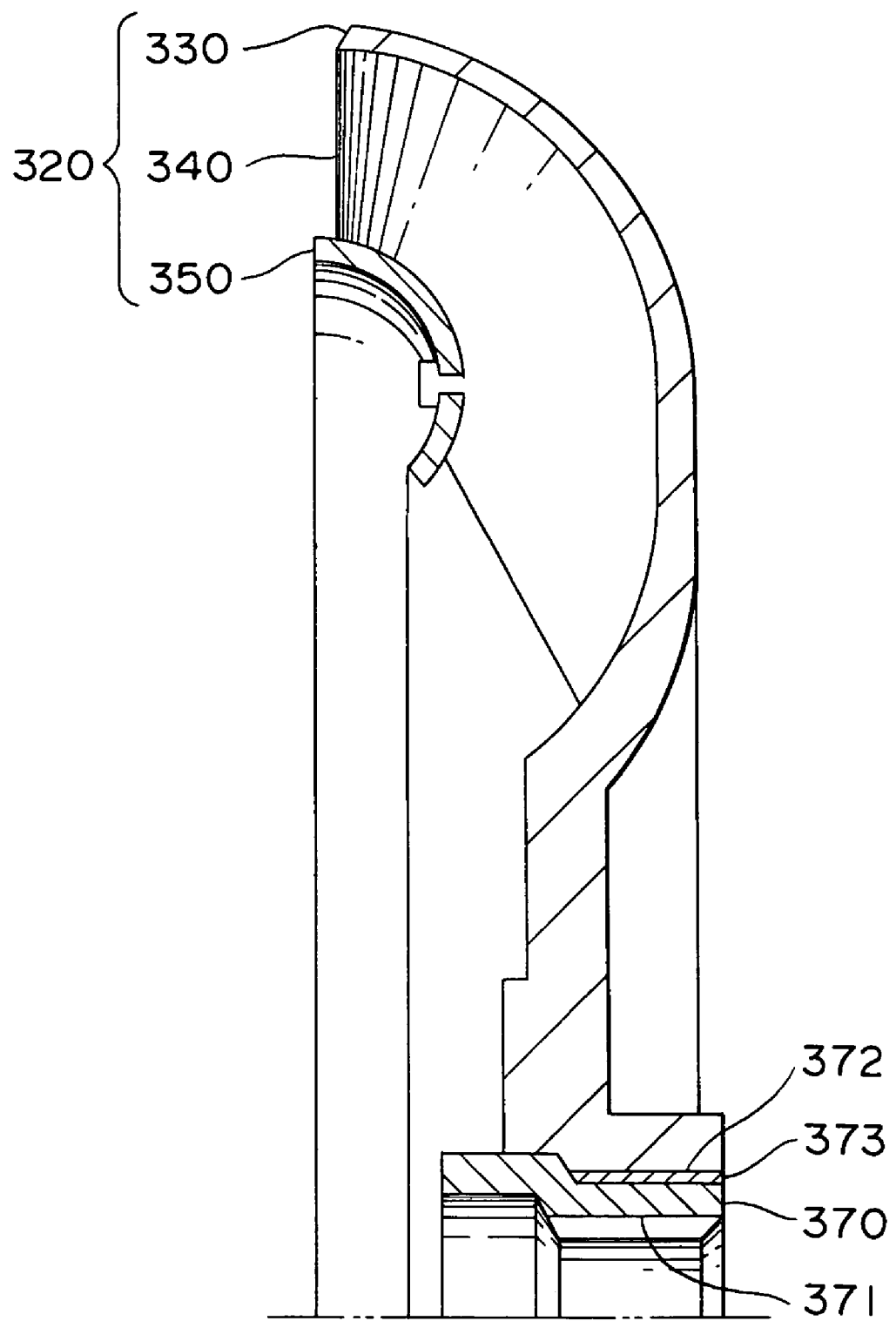
FIG. 11 is a sectional view of a turbine runner according to a forth embodiment.

FIG. 11 is a sectional view of a turbine runner according to a forth embodiment. A turbine runner 320 is substantially different from the turbine runner 220 of the third embodiment having the press-fitted turbine hub 270 in that it has an integrally cast or internally chilled turbine hub 370.

The turbine hub 370 is internally chilled and fixed to a shell 330 when blades 340 and the shell 330 are integrally cast. The turbine hub 370 is shaped substantially cylindrical and contains a splined section 371 for transmitting the output torque. An outer periphery 372 of the turbine hub 370 has a portion 373 which is processed to improve its friction. Said portion 373 constitutes of, for example, spline teeth-like undulations.

Therefore, the size and the machining area of the turbine hub 370 can be reduced, and also a separate process is unnecessary for mounting and fixing the turbine hub 370 in the fourth embodiment. Thus, the manufacturing cost is further reduced. The process of increasing the friction can be omitted if necessary.

Figure 12:
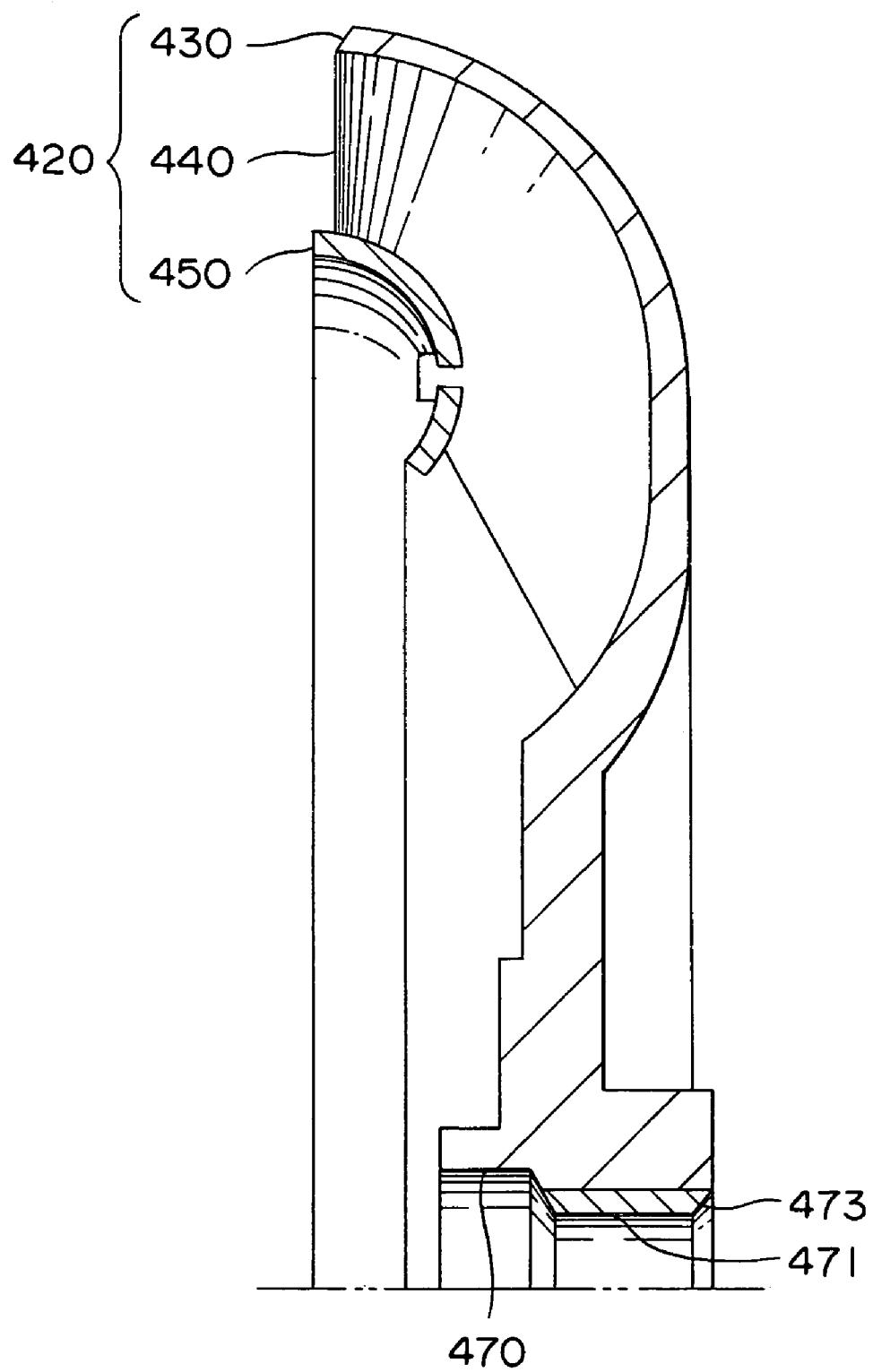
FIG. 12 is a sectional view of a turbine runner according to a fifth embodiment.

FIG. 12 is a sectional view of a turbine runner according to a fifth embodiment. A turbine runner 420 is generally different from the turbine runner 20, 120, 220, and 320 of the first through fourth embodiments in that it does not have the turbine hub as an independent component.

The shaft side of the shell 430, to which blades 440 are made integral parts thereof, has a substantially cylindrical shaped part 470 containing a splined section 471 for transmitting the output torque, and the shell 430, the blades 440, and the turbine hub (cylindrical shaped part 470) are cast as an integral unit. The splined section 471 has a surface hardened layer 473 for improving the durability to withstand against the operating surface pressure of the input shaft. The surface hardened layer 473 can be formed by steel spraying.

Therefore, the turbine hub as an independent component is made unnecessary and the assembly time is reduced, so that the manufacturing cost can be further reduced in the fifth embodiment. Moreover, weight reduction can be made easier as it is possible to make the unit containing the turbine hub as an integral part thereof rigid enough for the purpose.

Figure 13:
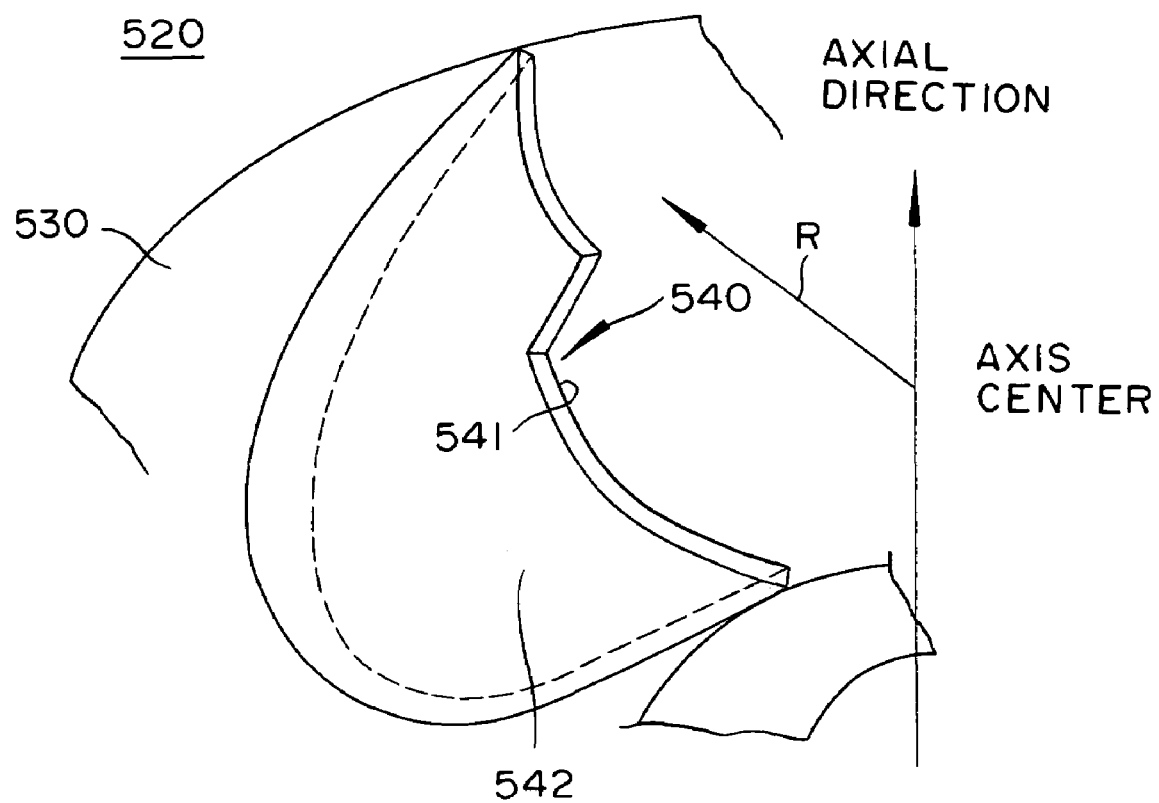
FIG. 13 is a perspective view of a turbine runner according to a sixth embodiment.

FIG. 13 is a perspective view of a turbine runner according to a sixth embodiment.

Figure 14:
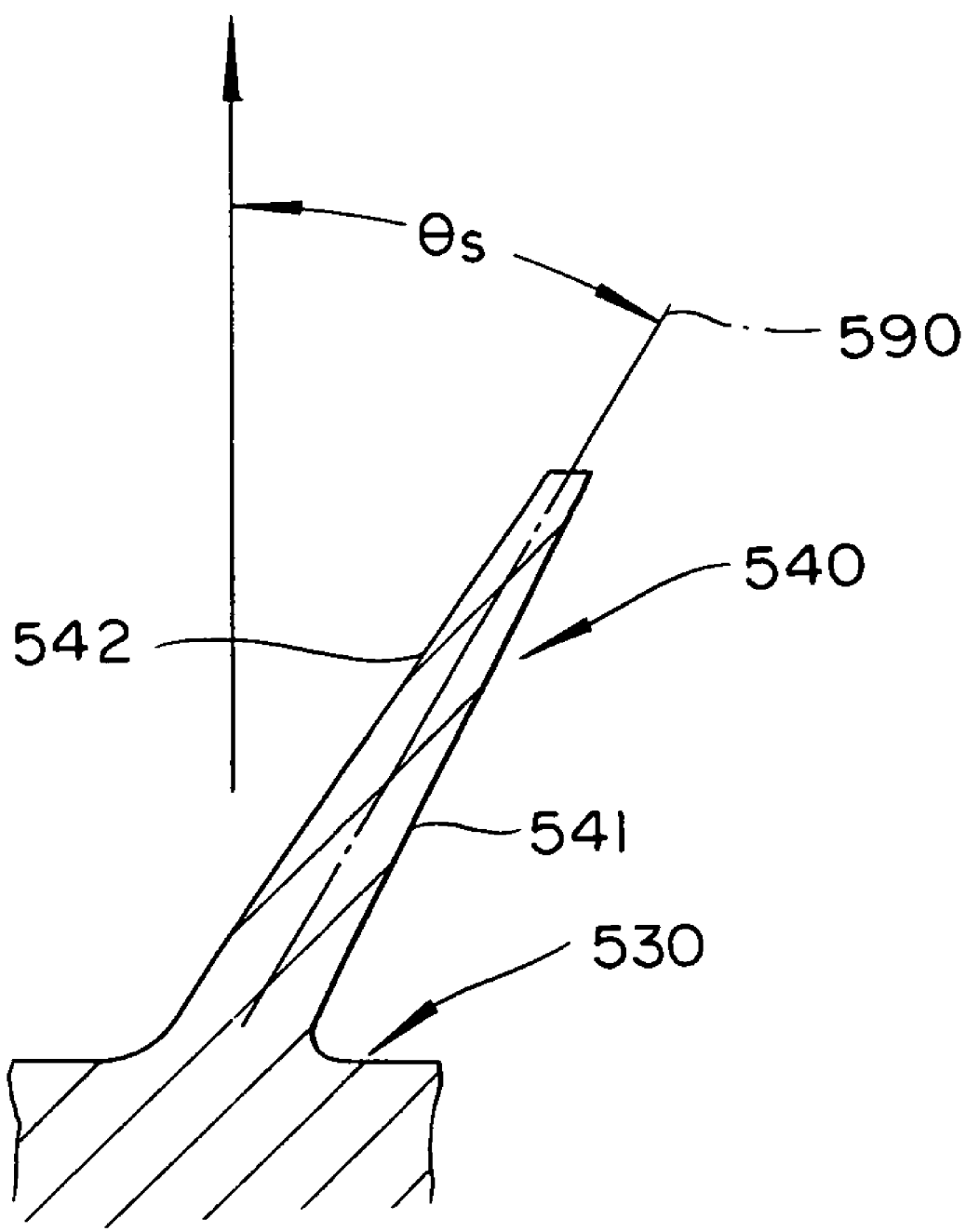
FIG. 14 is a sectional view of assistance in explaining a reference line of mold pullout direction.
Figure 15:
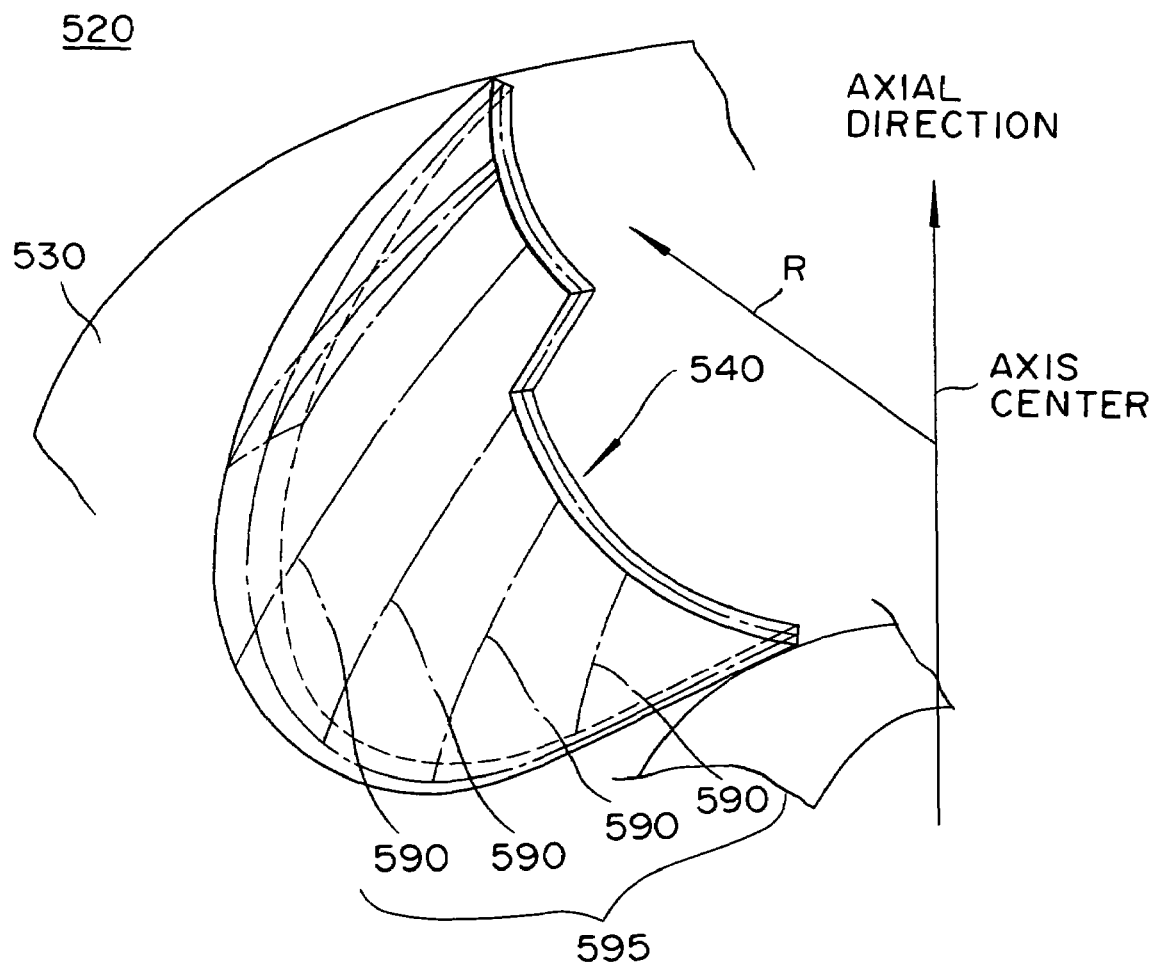
FIG. 15 is a perspective view of assistance in explaining a reference line of mold pullout direction.

FIGS. 14 and 15 are sectional and perspective views of assistance in explaining a reference line of mold pullout direction.

A turbine runner 520 is a coreless type not containing a core ring and is substantially different from the turbine runner 20 of the first embodiment in that the shapes of blades 540 are specified in detail.

The blade cross section or the cross section of the blade 540 along the circumferential direction from the axis center of the turbine runner 520 contains a reference line 590 of mold pullout direction defined by the tilt angle $\theta_S$ relative to the axial direction of the turbine runner 520.

The tilt angle $\theta_S$ (deg) is a function of R which is defined by a mathematical formula ($\theta_S = \tan^{-1}(C \times R)$). Symbol "R" represents the radial direction distance (mm) from the axis center of the turbine runner 520. Symbol "C" is a shape parameter (rad/m) that relates to the rotation angle and the moving distance during the rotary pullout of the molding die.

A curved surface 595, which is formed by the reference line 590 of mold pullout direction that varies continuously with reference to the radial direction distance R, defines the blade shape that makes the rotary pullout of the molding die possible.

Said blade shape corresponds to a case where the thickness is zero. Therefore, it is possible to optimize the hydrodynamic performance by adjusting the tilt angle $\theta_S$ by adjusting the shape parameter C as necessary.

Figure 16:
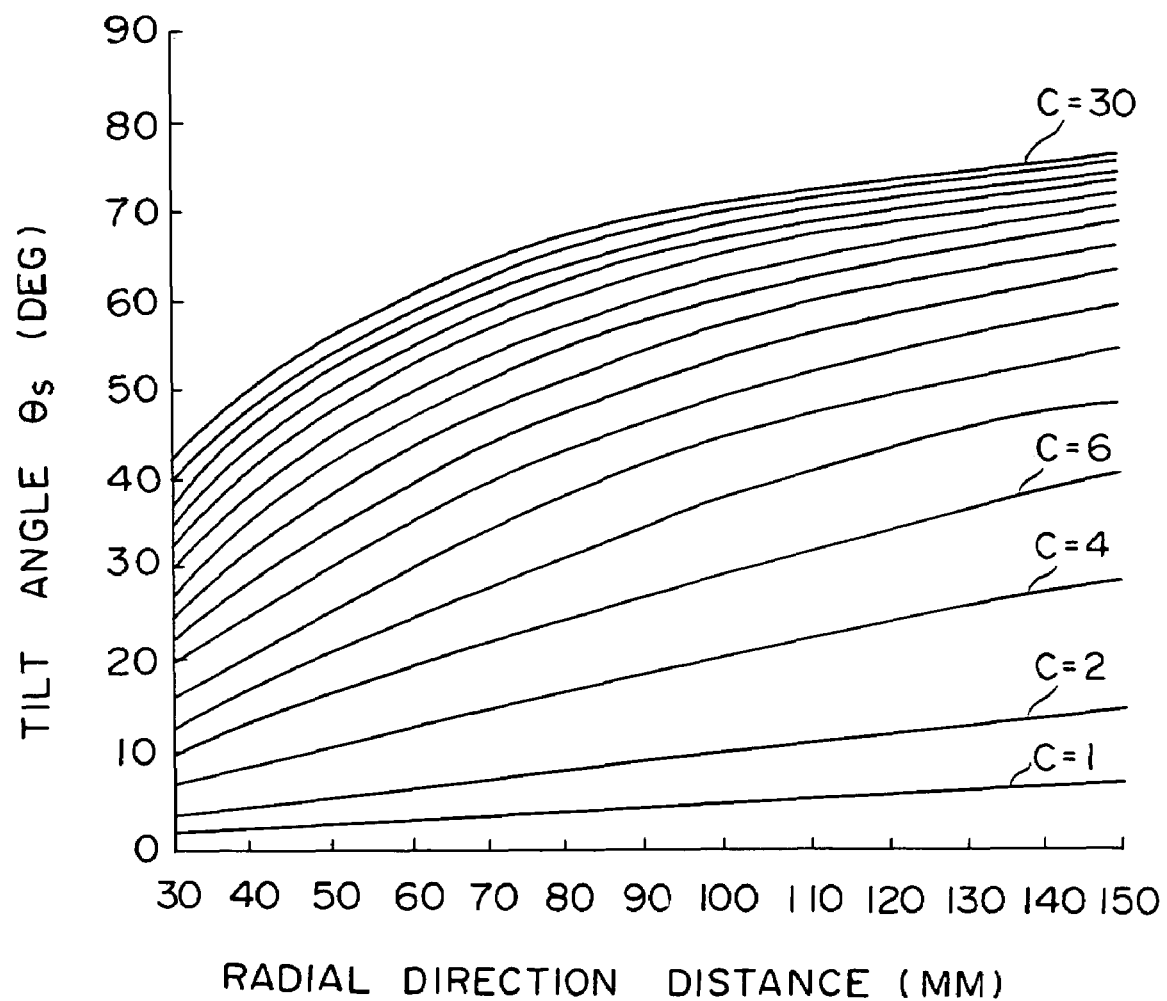
FIG. 16 is a radial direction distance R-tilt angle $\theta_S$ graph relative to shape parameter C.

FIG. 16 is a radial direction distance R-tilt angle $\theta_S$ graph relative to shape parameter C and the unit of the radial direction distance R is changed to be in millimeter.

When the radial direction distance R is constant, the tilt angle $\theta_S$ increases with the shape parameter C increases as shown in the drawing. There is a common tendency that the tilt angle $\theta_S$ increases with the radial direction distance R when the value of the shape parameter C is not zero.

When the shape parameter C is zero and the tilt angle $\theta_S$ is zero, the blade 540 is parallel to the axial direction of the turbine runner 520 and extends in right angles from the shell 530. When the shape parameter C is 30 rad/m and the radial direction distance R is 150 mm, the tilt angle $\theta_S$ is approximately 80 degrees.

The radial direction distance range the blades are arranged in a typical turbine runner is 30-150 mm. On the other hand, it becomes difficult to maintain a proper hydrodynamic performance when the tilt angle $\theta_S$ of the blade exceeds 80 degrees. Therefore, the shape parameter C should preferably be maintained within the range of 0-30 (rad/m).

Figure 17:
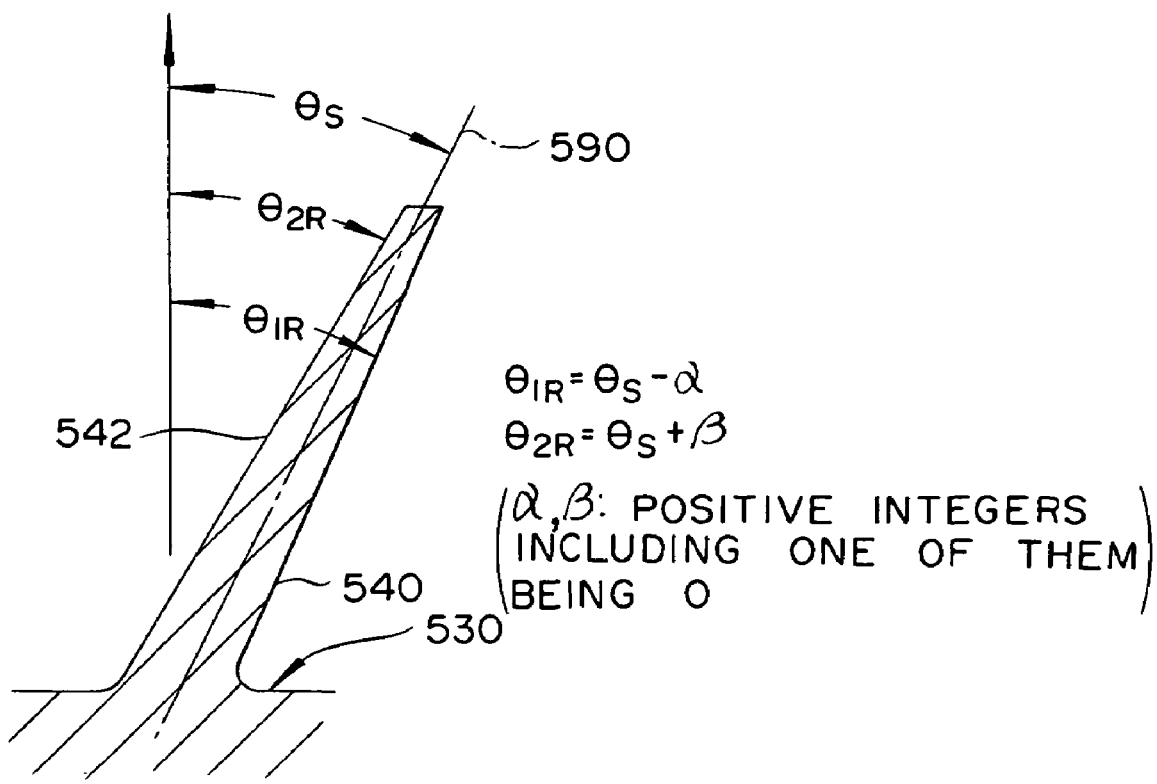
FIG. 17 is a sectional view of assistance in explaining a modification 1 of the sixth embodiment.

FIG. 17 is a sectional view of assistance in explaining a modification 1 of the sixth embodiment.

The tilt angle $\theta_{1R}$ of the edge line of the inner surface 541 and the tilt angle $\theta_{2R}$ of the edge line of the outer surface 542 of the blade cross section relative to the axial direction of a turbine runner 520 are preferable to satisfy mathematical formulas ($\theta_{1R} = \theta_S - \alpha$) and ($\theta_{2R} = \theta_S + \beta$) respectively. The parameters $\alpha$ and $\beta$ are positive constants including zero for one of them.

Since the inner surface 541 and the outer surface 542 are located on the positive and negative pressure sides respectively, the parameters $\alpha$ and $\beta$ correspond to the taper angles of the positive and negative pressure sides respectively. Therefore, the hydrodynamic performance of the blades 540 can be optimized by adjusting the value of the parameter α. On the other hand, the pressure or stress generated at the root side of the blades 540 can be reduced by adjusting the value of the parameter β.

Figure 18:
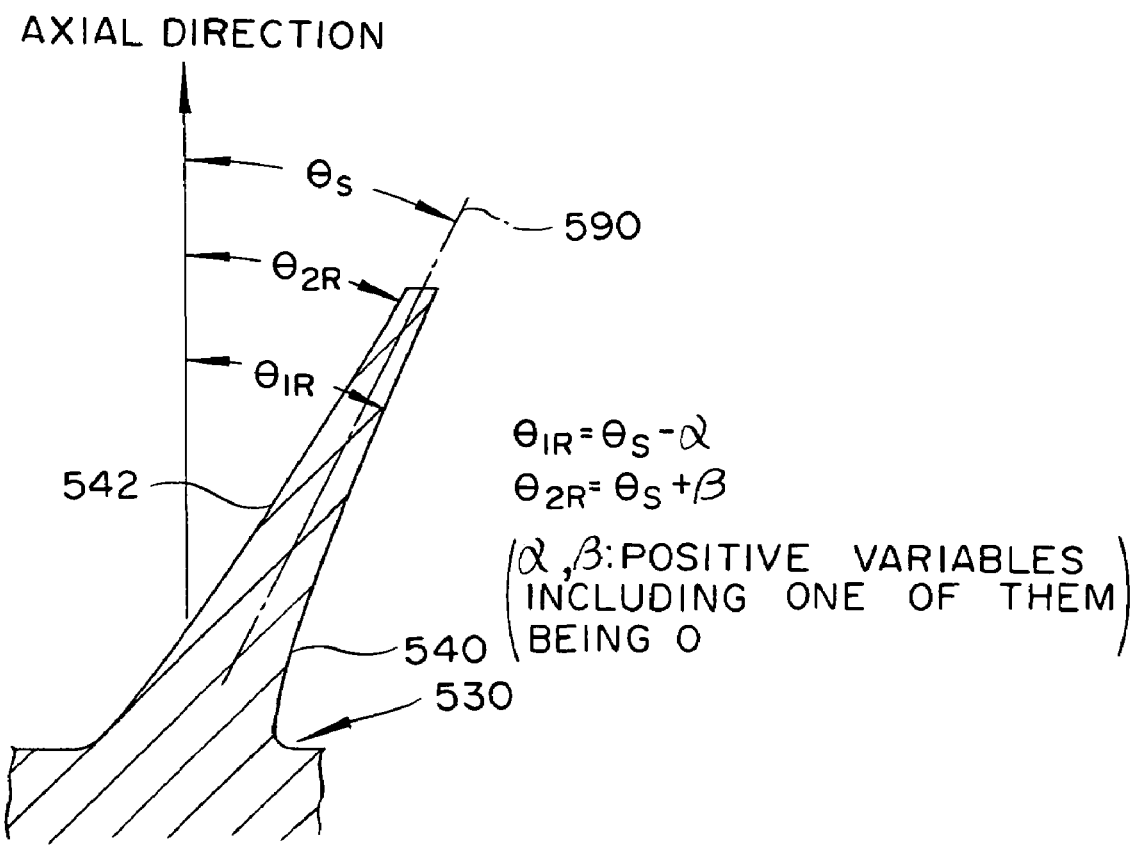
FIG. 18 is a sectional view of assistance in explaining a modification 2 of the sixth embodiment.

FIG. 18 is a sectional view of assistance in explaining a modification 2 of the sixth embodiment.

The parameters α and β do not necessarily have to be constants but rather one of them can be a positive variable including zero, or can be the radial direction distance R or a function of the distance from the shell 530 in the rectangular direction.

More specifically, it is possible to define the shape of the blade 540 in detail in order to improve the performance by increasing the parameters α and β from the tip side to the root side of the blade cross section.

Figure 19:
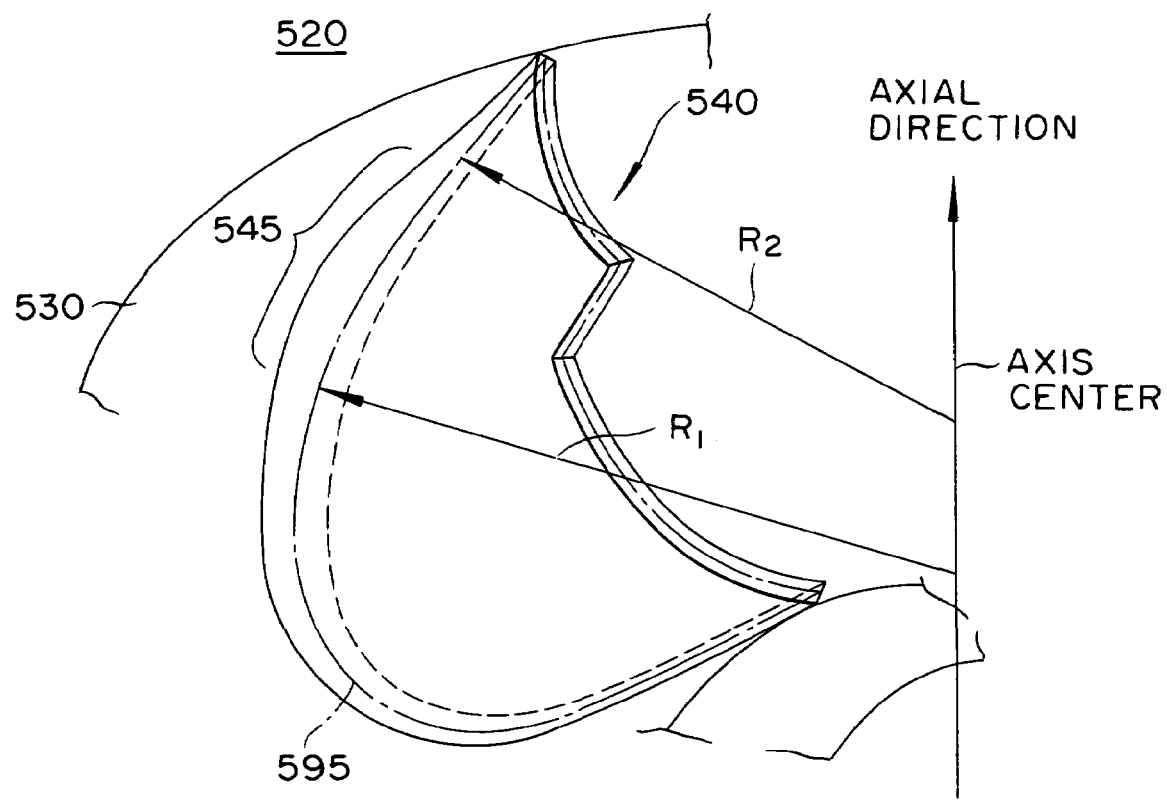
FIG. 19 is a perspective view of assistance in explaining a modification 3 of the sixth embodiment.

FIG. 19 is a perspective view of assistance in explaining a modification 3 of the sixth embodiment.

Although an increase of the parameter β can reduce the stress generated at the root side of the blade 540, it may also affect the hydrodynamic performance of the blade 540. Therefore, it is preferable to limit the increase of the parameter β within a range where the strength condition is severe, i.e., within a certain range of the radial direction of the blade 540 in order to restrain or minimize the effect on the hydraulic performance of the blade 540.

More specifically, the parameter β should be increased relative to those of other areas within a range between a location in the vicinity of the edge on the outer periphery of the shell 530 where the strength condition is severe and a location where the strength condition becomes less severe.

The location where the strength condition is severer and the location where the strength condition becomes less are the positions with the radial direction distance $R_1$ and the radial direction distance $R_2$ respectively. The generated stress can be effectively reduced in this case because the thickness of the root side of an area 545 where the strength is required increases.

It is obvious that this invention is not limited to the particular embodiments shown and described above but may be variously changed and modified without departing from the technical concept of this invention.

More specifically, although it has been described so far assuming the turbine runner is the impeller of the invention in the above, the invention can be applied to a pump impeller as well. Also, the constitution of the sixth embodiment can be combined with the first through fifth embodiments.

This application is based on Japanese Patent Application Nos. 2003-14933 filed on Jan. 23, 2003 and 2004-14351 filed on Jan. 22, 2004, the contents of which are hereby incorporated by reference.

What is claimed is:

1. A vane wheel for a torque converter comprising:
a plurality of blades formed integrally with a shell in a casting process,
wherein a blade tilts relative to an axial direction of the vane wheel and has an inner surface located on a positive pressure side thereof and an outer surface located on a negative pressure side thereof, in which a blade cross section along a circumferential direction from an axis center of the vane wheel contains a reference line of mold pullout direction defined by a tilt angle $\theta_S$ (deg) relative to the axial direction, said tilt angle $\theta_S$ defined by the following relation:

$$\theta_S = \tan^{-1}(C \times R)$$

in which R is a radial direction distance (m) from the axis center of the vane wheel and C is a shape parameter (rad/m),
in which a tilt angle $\theta_{1R}$ of an inner side edge line and a tilt angle $\theta_{2R}$ of an outer side edge line of the blade cross section relative to the axial direction of the vane wheel satisfy the following relation:

$$\theta_{1R} = \theta_S - \alpha \text{ and } \theta_{2R} = \theta_S + \beta$$

in which parameters α and β are non-negative constants including zero for one of the parameters α and β.

2. A vane wheel for a torque converter as claimed in claim 1, in which said shape parameter C is in a range of 0-30 (rad/m).

3. A vane wheel for a torque converter as claimed in claim 1, in which said parameters α and β increase from a tip side to a root side of the blade cross section.

4. A vane wheel for a torque converter as claimed in claim 1, in which said parameter β increases within a predetermined range in a radial direction of said blade.

5. A vane wheel for a torque converter as claimed in claim 4, in which said predetermined range is an area where strength is required.

6. A vane wheel for a torque converter as claimed in claim 1, in which a turbine hub is press-fitted into and fixed to said shell.

7. A vane wheel for a torque converter as claimed in claim 1, in which a turbine hub is internally chilled and fixed to said shell in the casting process.

8. A vane wheel for a torque converter as claimed in claim 1, in which a turbine hub is integrally formed with said shell.

9. A vane wheel for a torque converter as claimed in claim 1, wherein a root thickness in a middle section between an outer periphery side and an inner periphery side of said shell is thicker than a root thickness on the inner periphery side relative to the blade cross section.

10. A vane wheel for a torque converter as claimed in claim 1, in which an intersecting angle $\theta_1$ formed between a rotary pullout direction of a molding die and the inner side edge line of the blade cross section along the circumferential direction from the axis center of the vane wheel is greater than an intersecting angle $\theta_2$ formed between the rotary pullout direction and the outer side edge line of the blade cross section.

11. A method of manufacturing a vane wheel for a torque converter having a shell and a plurality of blades in a casting process using a mold assembly, said method comprising:
casting the vane wheel using the mold assembly,
wherein said mold assembly comprises a stationary die having a cavity surface that corresponds to an outer periphery of the shell and a movable die having a cavity surface that corresponds to an outer surface of a blade,
wherein said movable die is rotatable freely around an axis center of the vane wheel and movable freely along an axial direction of the vane wheel,
wherein said blade tilts relative to the axial direction of the vane wheel and has an inner surface located on a positive pressure side thereof and the outer surface located on a negative pressure side thereof, and
wherein a blade cross section along a circumferential direction from the axis center of the vane wheel contains a reference line of mold pullout direction defined by a tilt angle $\theta_S$ (deg) relative to the axial direction, said tilt angle $\theta_S$ defined by the following relation:

$$\theta_S = \tan^{-1}(C \times R)$$

in which R is a radial direction distance (m) from the axis center of the vane wheel and C is a shape parameter (rad/m), and separating the movable die from the stationary die by moving the movable die along the axial direction of the vane wheel while rotating the movable die around the axis center of the vane wheel after the casting process.

12. A method as claimed in claim 11, in which a root thickness in a middle section between an outer periphery side and an inner periphery side of said shell is thicker than a root thickness on the inner periphery side relative to the blade cross section.

13. A method as claimed in claim 11, in which an intersecting angle $\theta_1$ formed between a rotary pullout direction of the movable die and an inner side edge line of the blade cross section along the circumferential direction from the axis center of the vane wheel is greater than an intersecting angle $\theta_2$ formed between the rotary pullout direction and an outer side edge of the blade cross section.

14. A method as claimed in claim 11, in which a tilt angle $\theta_{1R}$ of an inner side edge line and a tilt angle $\theta_{2R}$ of an outer side edge line of the blade cross section relative to the axial direction of the vane wheel satisfy the following relation:

$$\theta_{1R}=\theta_S-\alpha \text{ and } \theta_{2R}=\theta_S+\beta$$

in which parameters $\alpha$ and $\beta$ are non-negative constants including zero for one of the parameters $\alpha$ and $\beta$.

* * * * *